Figure 1B:
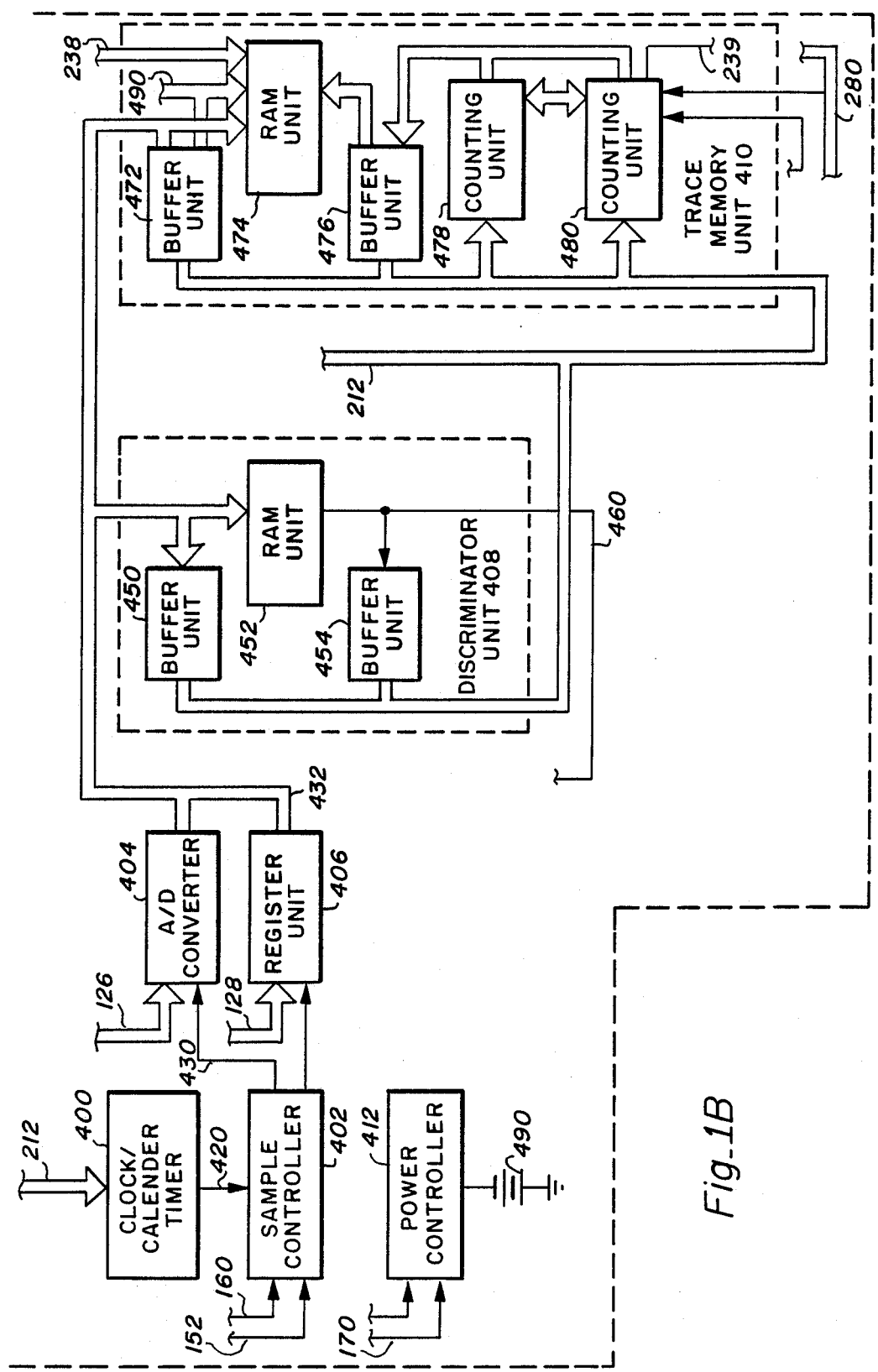

United States Patent [19]

Wilburn et al.

[11] Patent Number: 4,817,118
[45] Date of Patent: Mar. 28, 1989

[54] MOBILE INCIDENT LOGGER

[75] Inventors: Darrell L. Wilburn, Saratoga; Darryl R. Plauck, Campbell, both of Calif.

[73] Assignee: Step Engineering, Sunnyvale, Calif.

[21] Appl. No.: 68,033

[22] Filed: Jun. 29, 1987

[51] Int. Cl.[4] .................. G06F 13/00; G06F 11/00
[52] U.S. Cl. ................................. 377/26; 377/16; 364/424.04
[58] Field of Search ............ 377/26, 16, 28–30, 377/19; 371/16; 364/424, 550, 900; 340/52 R, 52 F

[56] References Cited

U.S. PATENT DOCUMENTS

| | | | |
|---|---|---|---|
| 3,881,156 | 4/1975 | Deutsch | 328/75 |
| 4,072,850 | 2/1978 | McGlynn | 364/424 |
| 4,258,421 | 3/1981 | Juhasz et al. | 340/52 F |
| 4,608,638 | 8/1986 | Tsikos | 364/424 |
| 4,611,281 | 9/1986 | Suke et al. | 371/16 |
| 4,630,043 | 12/1986 | Haubner et al. | 364/424 |
| 4,636,967 | 1/1987 | Bhatt et al. | 364/550 |
| 4,674,089 | 6/1987 | Poret et al. | 371/16 |
| 4,718,025 | 1/1988 | Minor et al. | 364/550 |
| 4,730,314 | 8/1988 | Noguchi | 371/16 |

Primary Examiner—John S. Heyman
Assistant Examiner—Tai V. Duong
Attorney, Agent, or Firm—Thomas E. Schatzel

[57] ABSTRACT

Disclosed is a mobile incident logger for monitoring an on-board, automotive, computer and signal levels developed by analog and digital sensors, the logger employing a coverage monitor, which records which memory locations are accessed by the computer; a cycle tag counting unit, which counts bus cycles of the computer; a discriminator, which detects the occurrence of incidents the logger is to record; a trace memory unit, which stores bus states of the computer; a trace memory unit, which stores memory variables of the computer; a discriminator, which detects the occurrence of some of the incidents the logger is to record; and a trace memory unit, which stores the sensor signals.

13 Claims, 2 Drawing Sheets

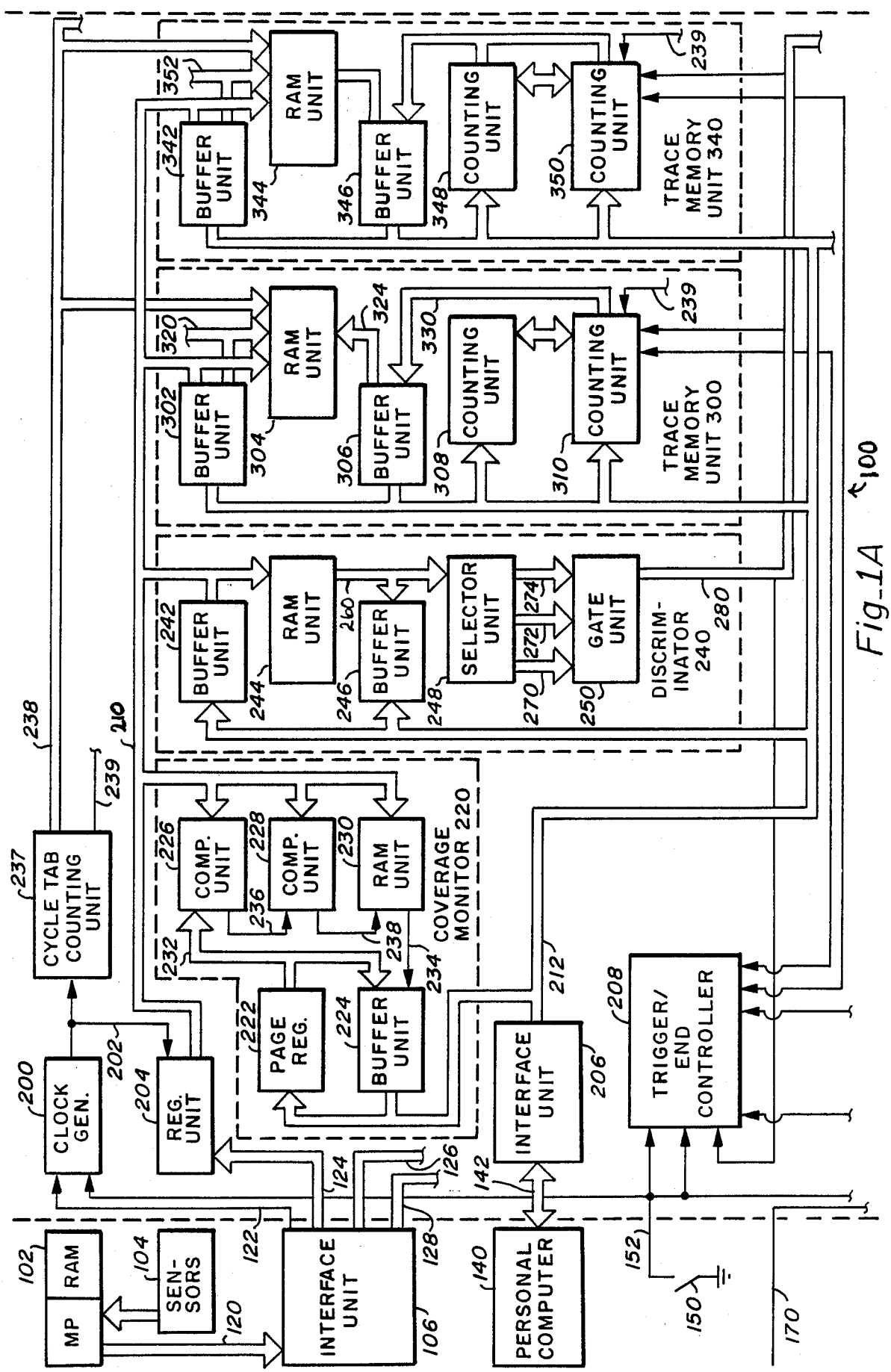
Fig_1A

MOBILE INCIDENT LOGGER

TECHNICAL FIELD

The present invention relates to electronic test equipment generally and more specifically to a mobile logger for recording as incidents, bus states of an on-board, automotive, computer and signal levels developed by analog and digital sensors, when the incidents meet predetermined criteria.

BACKGROUND ART

On-board computers are assuming more and more of the tasks associated with running automobiles. A the complexity of the computers and of the tasks have increased, so has the difficulty of insuring the proper operation of the computers. this is due in part to the fact that the response of a computer may be a function, not only of the computer's immediate inputs, but a history of the computer's inputs and bus states. Thus, in analyzing a particular computer response, it is often useful to know certain of the computer's prior inputs and bus states.

Although logic analyzers, such as the logic analyzer which is designated 1631A/D by Hewlett-Packard Inc., are of use in recording the bus states of computers, such analyzers are less than ideally suited for long term, dedicated, monitoring of on-board computers.

Also, although the system which is referred to as a Flight Recorder by the Grid Corporation is designed for long term monitoring of on-board computers, the system lacks the means necessary to provide critical information.

DISCLOSURE OF THE INVENTION

Thus, the primary object of the present invention is to provide a mobile incident logger suited for long term, dedicated monitoring of on-board computers and their sensors.

Another object of the present invention is to provide a mobile incident logger which "filters" data to "compress" a large volume of data into a manageable amount of storage.

Still another object of the present invention is to provide a mobile incident logger which stores as incidents microprocessor bus states, as well as microprocessor random access memory (RAM) variables as well as external sensor input variables.

Briefly, the present preferred embodiment of the present invention employs a coverage monitor, which records which locations in a preselected page of a random access memory (RAM) of an on-board computer a microprocessor of the computer accesses; a cycle tag counting unit, which counts bus cycles of the microprocessor; a discriminator (comparator), which detects the occurrence of some of the incidents the logger is to record; a trace memory unit, which stores incidents relating to the bus states of the microprocessor; a trace memory unit, which stores incidents relating to memory variables of the on-board computer; a discriminator (comparator), which detects the occurrence of some of the incidents the logger is to record; and a trace memory unit, which stores incidents relating the level of analog signals developed by a number of (analog) sensors which drive the computer and to the state of digital signals developed by a number of (digital) sensors which drive the computer.

These and other objects of the present invention will no doubt become apparent to those skilled in the art after having read the detailed description of the presently preferred embodiment o the present invention which is illustrated in the figures of the drawing.

BRIEF DESCRIPTION OF THE FIGURES IN THE DRAWING

FIGS. 1A and 1B taken together form a block diagram of the present tly preferred embodiment of a mobile incident logger in accordance with the present invention.

BEST MODE FOR CARRYING OUT THE INVENTION

Illustrated in FIG. 1 of the drawing generally designated by the number 100 is a block diagram of the presently preferred embodiment in accordance with the present invention of a mobile incident logger. With logger 100 is illustrated a block 102, which represents a target computer, such as, for example, an on-board computer of an automobile (the computer, typically, having a microprocessor (uP) and it's associated random access memory (RAM); a block 104, which represents the sensors that drive computer 102; and a block 106, which represents an interface unit. Unit 106 is connected to (or plugged into) computer 102, the connection being represented by a bus 120. Additionally, unit 106 is connected to logger 100 by a line 122 and three busses, respectively designated 124, 126, and 128. Unit 106 includes the circuitry necessary to receive signals developed by computer 102 and to develop signals suitable for driving logger 100. More specifically, unit 106 develops on line 12 a signal representing the (master) clocking signal (which defines the microprocessor bus states 6811) and which is) developed by (the microprocessor of) computer 102; develops on bus 124 signals representing the address, the data, and the status (control) signals developed by (the microprocessor of) computer 102; develops by the (analog) sensors which drive computer 102; and develops on bus 128 signals representing the digital signals (states) developed by he (digital) sensors (switches) which drive computer 102.

Also with mobile incident logger 100 is illustrated a block 140, which represents a personal computer, such as, for example, the personal computer which is referred to as a PC convertible by the international Business Machines Corporation. Computer 140 is connected to logger 100 by a bus 142. In a "programming" mode, computer 140 develops on bus 142 signals which specify the type of incidents logger 100 is to record ("program" the logger). In a "reporting" mode, when requested by means of signals developed by computer 140 on bus 142, logger 100 develops on the bus signals which represent recorded incidents.

Further, with mobile incident logger 100 is illustrated a push-button type switch 150, which is connected to the logger by a line 152. Switch 150 provides a means by which an operator may manually generate an end triggering signal. Finally, to provide DC, electrical, power to logger 100 in a 'recording' mode, a line 170 couples external power from the automobile to the logger.

Mobile incident logger 100 is shown to employ a clock generator 200, which is responsive to the signal developed on line 122 by interface unit 106 from the on-board computer 102 (bus state defining) clocking signal and operative to develop on a line(s) 202 a signal(s) suitable for driving the other components of logger 100. For this purpose, generator 200 includes a 74ACT00-type, 2-input, NAND gate (not shown) and a 74ACT157-type, quadruple, 2-line-to-1-line, data selecting/multiplexing device (also not shown). The gate is configured to invert the logic level of the clocking signal developed on line 122. MOre specifically, one input of h gate is connected to line 122; and, the other input of the gate is connected to a high-logic-level potential. The selecting/multiplexing device is configured to select for use by logger 100 the (true-level) clocking signal developed on line 122 or the (inverted-level) clocking signal developed at the output of the gate. More specifically, the four data inputs of one set of data inputs of ht selecting/multiplexing device are connected each to line 122; and, the four data inputs of the other set of data inputs of the selecting/multiplexing device are connected each tot he output of the gate. The select input of the selecting/multiplexing device is connected to receive a clocking-signal-level selecting signal; and the four data outputs of the selecting/multiplexing device are connected each to a separate line for driving a respective position of logger 100. (In the drawing, only a single line, line 122, is shown).

In addition, clock generator 200 includes a 74HC86-type (2-input) exclusive OR gate, a pair of 74HCT74-type, D-type, flip-flops, a 74HCT00-type, 2-input, NAND gate, and a 74HC158-type, quadruple, 2-line-to-1-line, data selecting/multiplexing device (all not shown). To selectively invert the level of the clocking signal developed on line 122, the exclusive OR gate is configured with one of the gate inputs connected to line 122 and the other one o f the gate inputs connected to receive the clocking-signal-level selecting signal. THe flip-flops are configured with the clock input of each of the flip-flops connected ot he output of the exclusive OR gate; with the data input of a first one of the flip-flops connected to receive a clock generator 200 enabling signal; with the data input of the other (second) one of the flip-flops connected to the output of the NAND gate; with the (non-inverted) output of the first flip-flop connected to one of the two inputs of the NAND gate; and with the (inverted) output of the second flip-flop connected to one of the data inputs of the lowest order section of the (74HCT158-type) selecting/multiplexing device. The other data input of the lowest order section of the (74HCT158-type) selecting/multiplexing device is connected ot receive the clock generator 200 enabling signal; the data output of the lowest order section of the (74HCT158-type) selecting/multiplexing device is connected tot he enable input of the 74HCT157-type selecting/multiplexing device; and, the other input of the NAND gate is connected to receive another clock generator 200 enabling signal. THe enabling signals enable (arm) the operation (start) of clock generator 200 and select whether the clocking signal should start asynchronously (waiting two clocking cycles for a known good line 122 signal state) (for normal operation) or synchronously (for signal stepping with the line 152 externally generated triggering signal).

Finally, clock generator 200 includes a pair of delay lines of the type which are designated DDU-222C-100 by Data Delay Devices Inc. and a number of gates (all not shown). The delay lines are configured to develop a number of signal each of which represent the clocking signal developed on line 202, but delayed a respective multiple of 20 nanoseconds. For this purpose, the delay lines are connected in cascade. In other words, the input of a first one of the delay lines is connected to one of the data outputs of the 74HCT157-type selecting/multiplexing device; and, the input of the other (second) one of the delay lines is connected to the (last) output of the first delay line. The gates are configured to develop from th delay lines developed signals, signals for controlling the clocking of the various other components of mobile incident logger 100.

Mobile incident logger 100 employs register unit 204, an interface unit 206, and a trigger/end controller 208. Register unit 204 includes seven 74ACT374-type, octal, D-type, edge-triggered flip-flop devices (not shown) which are configured to latch the state of each of the signals. developed on the various lines of bus 124 at each of the times designated by the clocking signal developed on line 202 and to develop on the corresponding lines of a bus 210 signals having the latched state. For this purpose, the data inputs of ht flip-flop devices are connected each to a respective line of the various lines of bus 124; the data outputs of the flip-flop devices are connected each to a respective line of the various lines of bus 210; and the clock input of each of the flip-flop devices is connected to line 202. Finally, the output-enable input of each of the flip-flop devices is connected to interface unit 206.

Interface unit 206 includes a number of (74HC138-type, 74HCT244-type, 74HCT373-type, 74HC374-type, and 74HC688-type) devices, flip-flops, gates, and switches configured to map random access memory (RAm) and other components of mobile incident logger 100 into a portion of the address space (64K) and I/O space (16 ports) of personal computer 140 (a portion which is specified by settings of the switches) to permit the computer to initialize logger 100 in the "programming" mode and to receive data representing recorded incidents in the "reporting" mode. Further, the devices are configured to latch the state of signals developed by computer 140 in the "programming" mode to configure (the personality of) logger 100 and to program the logger as to the incidents the logger is to record. Further, when DC, electrical, power is not available on line 170 from the automobile, unit 206 provides power from computer 140 to logger 100.

Trigger/end controller 208 includes circuitry configured as a register and as a multiplexer for selecting between several end triggering signals. Additionally, in another embodiment, controller 208 includes circuitry configured as a counter f or ending the recordation of data a predetermined number of clocking cycles after the time delineated by t he selected one of the end triggering signals.

Mobile incident logger 100 employs a coverage monitor unit 220, which records which locations in a preselected page of random access memory (RAM) of on-board computer 102, the (microprocessor of the) computer accesses. For this purpose, monitor unit 220 has a page register 222, a buffer unit 228, and a random access memory (RAM) unit 230. Register unit 222 includes a 74ACT374-type, octal, D-type , edge-triggered flip-flop device (not shown) which is configured to latch the state of signals developed on bus 212 and to develop signals having he latched states on an 8-line bus 232. For this purpose, the eight data inputs of the device are connected each to a corresponding line of a set of eight data lines of the lines of bus 212; and, the eight data outputs of the device are connected each to a corresponding line of the eight lines of bus 232. The clock input of the device is connected to interface unit 206.

Buffer unit 224 includes a pair of 74HC244-type octal buffering devices (not shown). THe devices are configured, one with the eight data inputs of one of the devices connected each to the corresponding line of the eight lines of bus 232. ONe of the data inputs of the other device is connected to a line 234. THe the eight data outputs of each of the devices are connected each to the corresponding lines of the eight lines of bus 212. the output-enable inputs of each of the devices a re connected to interface unit 206.

Comparator unit 226 includes a 74HC688-type 8-bit equality comparator device which is configured with the eight data inputs of one of the sets of data inputs (Q) of the device each connected to the corresponding line of the eight lines of bus 232; and, with the eight data inputs of the other one of the sets of data inputs (P) of the device each connected to the respective one of the eight highest order lines of a set of 24 address lines of bus 210. THe enable input of the device is connected to interface unit 206; and, the equal output of the device is connected to drive a latching circuit that is connected to comparator 228 by a line 236.

Comparator unit 228 includes a 74AC151-type, 1-of-8, data selecting/multiplexing device and a pair of 74AC04-type inverters, which are configured with one of the data inputs (I1) of the selecting/multiplexing device coupled by one of the inverters to a line of a set of the eight status lines of bus 210 to receive a signal which indicates that (the microprocessor of) on-board computer 102 is performing a "read" operation. (when inverted yb the inverter, the signal indicates that the computer is performing a "write" operation.) Another one of the data inputs (I2) of the device is (directly) connected to the read status line of bus 210. Yet another one of the the data inputs (I3) of the device is coupled by the other one of the inverters to a status line of bus 210 to receive an LIR (instruction fetch) status signal; and, still another one of the data inputs (I4) of the device is (directly) connected tot he LIR status line. The three select inputs of the device are connected to interface unit 206; the enable input of the device is connected to line 236; and, the data output of the device is connected to random access memory (RAm) unit 230 by a line 238.

Random access memory (RAm) unit 230 includes a HM6287PL-70-type, 64K-by-1, static (CMOS) random access memory (RAM) device, and a pair of 74AC08-type 2-input, negative input, NOR gates (all not shown). THe memory device is configured with the 16 address inputs of the device each connected to a corresponding one of the 16 lowest order address lines of bus 210. The chip-select input and the write-enable input of the device are each connected to the output of a respective one of the gates. One of the two inputs of each of the gates is connected to line 238. The other input of each of the gates, and the data input of the device, are each connected to interface unit 206. Finally, the data output of the device is connected to line 236.

Mobile incident logger 100 employs a 24-bit cycle tag counting unit 237, which includes six, 74HC163-type, synchronous, presettable, 4-bit, counting devices; three, 74HC244-type octal buffering devices; three, 74HC245-type octal transceiving devices; and additional circuitry (all not shown), configured to count the cycles of the clocking signal developed on line 202 (and, thus, the bus state defining clocking cycles of the microprocessor of on-board computer 102), to develop signals on a bus 238 representing the count, and to develop a signal on a line 239 which delineates when the count "rolls over".

In addition, mobile incident logger 100 employs a discriminator (comparator) 240, which detects t he occurrence of some of the incidents the logger is to record. For this purpose, discriminator 240 has a buffer unit 242, a random access memory (RAM) unit 244, another buffer unit 246, a selector unit 248, and a gate unit 250. Buffer unit 242 includes six, 74HC244-type octal buffering devices (not shown), which are configured to selectively couple signals developed on (a set of 16 address lines of) bus 212 to (the lines of) bus 210, in the programming mode. More particularly, The (eight) data inputs of each of three of the buffering devices are connected each to the corresponding line of the eight lowest order lines of the 16address lines of bus 212. Connected to each of the eight highest order lines of the 16 address lines of bus 212 are each of the respective data inputs of each of the other three buffering devices. In general, the data outputs of all of the buffering devices (48 in all) are connected, each to the respective line (of 48 lines) of bus 210. The output-enable inputs of each of the devices are connected to interface unit 206.

Random access memory (RAM) unit 244 includes five, MS62256-70-type, 32K-by-8, static (CMOS) random access memory (RAM) devices (not shown). A pair of the devices are connected in a 64K-by-8 configuration with the (15) address inputs of each of the pair of devices connected each to the corresponding line of the 15 lowest order lines of the 24 address lines of bus 210. Connected to each of the 15 lowest order lines of a set of 16 data lines of bus 210 are each of the corresponding address inputs of each of another pair of the devices which are also connected in the 64K-by-8 configuration. The address inputs of the remaining device are connected, eight each tot he respective line of the eight highest order lines of the 24 address lines of bus 210 and six each to the respective line of six of a set of eight status lines of the bus. (Half of the later device is used to store text, such as, for instance, instructions and messages for the operator.) The 40 data inputs/outputs of the devices are connected each to a corresponding line of a 40 line bus 260. The chip-select, read/write, and output-enable inputs of each of the devices are connected to interface unit 206.

Buffer unit 246 includes six, 74HC245-type octal transceiving devices (not shown), which are configured to selectively couple signals between (the lines of) bus 260 and (the eight data lines of) bus 212, in the programming mode. More particularly, the (eight) data inputs/outputs of one of the two sets of data inputs/outputs (A inputs/outputs) of each of ht six transceiving devices are connected each to he corresponding line of the eight data lines of bus 212; and, the data inputs/outputs of the other set of data inputs/outputs (B inputs/outputs) of all of the six transceiving devices (48 in all) are connected each to the respective line of the (48) lines of bus 260. The direction and output-enable inputs of each of the devices are connected to interface unit 206.

Selector unit 248 includes four, 74ACT157-type, quadruple, 2-line-to-1-line, data selecting/ multiplexing devices (not shown). One pair of the selecting/multiplexing devices is configured to select the signals developed (on bus 260) by one, or th other, of the "low-address" random access memory (RAM) devices of random access memory (RAM) unit 244 and to couple the selected (eight) signals each to a corresponding line of an 8-line bus 270. Similarly, the other pair of the selecting/multiplexing devices is configured to select the signals developed (on bus 260) by one, or the other, of the "data" random access memory (RAM) devices of random access memory (RAM) unit 244 and to couple the selected (eight) signals each to a corresponding line of an 8-line bus 272. Finally, the (eight) signals developed (on bus 260) by the "high-address/status" random access memory (RAM) device of random access memory (RAM) unit 244 are directly coupled each to a corresponding line of an 8-line bus 274. The select input of each of the devices is connected to interface unit 206.

Gate unit 250 includes six, 74AC10-type 3-input NAND gates (not shown), which are configured to gate together the corresponding ones of the signals developed on busses 270, 272, and 274 to develop signals on an 8-line bus 280. In other words, each of the gates are configured with one of the inputs connected tot he corresponding line of bus 270, with another of the inputs connected tot he corresponding line of bus 272, with the other input connected to the corresponding line of bus 274, and with the output connected to the corresponding line of bus 280. The gate developed, bus 280 signals include an end triggering signal (which drives trigger/end controller 208), three store controlling signals, and four trace level controlling signals.

Mobile incident logger 100 employs a trace memory unit 300 which stores incidents relating tot he bus state of (the microprocessor of) on-board computer 102. For this purpose, memory unit 300 has a buffer unit 302, a random access memory (RAM) unit 304, another buffer unit 306, a counting (sequencing) unit 308, and another counting (sequencing) unit 310. Buffer unit 302 includes seven, 74HC245-type octal transceiving devices (not shown), which are configured to selectively couple signals between (the eight data lines of) bus 212 and both (the lines of) bus 210 and (eight lines which form) a bus 320, in the programming mode. More particularly, the (eight) data inputs/outputs of one of the two sets of data inputs/outputs (A inputs/outputs) of each of the seven transceiving devices are connected each to the corresponding line of the eight data lines of bus 212. The data inputs/outputs of the other set of data inputs/outputs (B inputs/outputs) of all of six of the seven transceiving devices (48 in all) are connected each tot he corresponding line of the (48) lines of bus 210. Finally, the data inputs/outputs of the other set of data inputs/outputs (B inputs/outputs) of the seventh transceiving devices are connected each to the corresponding line of the lines of bus 320. The direction and output-enable inputs of each of the devices are connected to interface unit 206.

Random access memory (RAM) unit 304 includes 10, MS62256-70-type, 32K-by-8, static (CMOS) random access memory (RAM) devices (not shown). The data inputs/outputs of six of the devices (48 in all) are connected each to a corresponding line of the 48 lines of bus 210. connected each to a corresponding line of the eight lines of bus 320 are the data inputs/outputs of another one of the devices. The data inputs/outputs of the remaining three of the devices (24 in all) are connected each to a corresponding line of the 24 lines which form bus 238. The (15) address inputs of each of the devices are connected each to a corresponding line of 15 lines which form a bus 324. The chip-enable, read/write, and output-enable inputs of each of the devices are connected to interface unit 206.

Buffer unit 306 includes a pair of 74HC244-type octal buffering devices (not shown), which are configured to selectively couple signals developed on 15 lines forming a bus 330 each to a corresponding line of (the 15 lines of) bus 324. For this purpose, (15 of the 16 of) the data inputs of the pair of devices are connected each to a respective line of bus 330; and, (the corresponding 15 of the 16) of the data outputs of the the pair of devices are connected each tot he respective line of the 15 lines of bus 324. The output-enable inputs of each of the devices are connected to interface unit206. In addition, buffer unit 306 includes another pair of 74HC244-type octal buffering devices (not shown), which are configured to selectively couple signals developed on bus 212 to bus 324. More specifically, (15 of the 16 of) the data inputs of the later pair of devices are connected each to a respective line of the 15 lowest order liens of the 16 address lines of bus 212; and, (the corresponding 15 of the 16) of the data outputs of the later pair of devices are connected each to a unique one of the 15 line of bus 324. The output-enable inputs of each of the devices are connected to interface unit 206. Further, buffer unit 306 includes a pair of 74AC374-type, octal, D-type, edge-triggered flip-flop devices (not shown) which are configured to latch the state of each of the signals developed on t eh 15 lines of bus 330 and to selectively develop on bus 212 signals each having a unique one of the latched states. Specifically, (15 of the 16 of) the data inputs of the pair of 74AC374-type devices are connected each to a respective line of the 15 lines bus 330. the data outputs of each of the pair of 74AC374-type devices are connected each tot he corresponding line of the eight data lines of bus 212. The clock input of each of the devices is connected to interface unit 206.

Counting unit 308 includes three, 74HC163-type, synchronous, presettable, 4-bit, counting devices, a pair of 74AC00-type, 2-input, NAND gates, and a 74AC109-type, JK-type, flip-flop, all configured as a 13-bit counter. THe (four) preset inputs of a first one of the counting devices are connected each tot he four lowest order data lines of bus 212. Connected each tot he four highest order data lines of bus 212 are the preset inputs of a second one of the counting devices. THe preset inputs of the remaining (third) counting device are, also, connected each to the four lowest order data lines of bus 212. The (12 in all) data outputs of the three counting devices are connected each to a respective line of the 12 lowest order lines of the 15 lines of bus 330. THe next higher order line of bus 330 is connected ot the (non-inverting) data output of the flip-flop. THe clock input of the counting devices and the flip-flop are connected tot he output of circuitry which is driven by one of the store controlling signals developed on one of the lines of bus 280. The load input of each of the counting devices is connected to interface unit 206. The ripple-carry output of the first counting device is connected to the P enable input of the second an d third counting devices and to one of the (two) inputs of a first one of the gates; the ripple carry output of the second counting device is connected to the T enable input of the third counting device; and, the ripple-carry output of the third counting device is connected to the other input of the first gate. The output of the first gate is connected to the K input of the flip-flop and to one of the (two) inputs of the other (second) gate the output of which is connected to the J input of the flip-flop.

Counting unit 310 includes another 74HC163-type, synchronous, presettable, 4-bit, counting device, a pair of 74AC00-type, 2-input, NAND gates, and a 74HC158-type, quadruple, 2-line-to-1-line, data selecting/multiplexing device (all not shown), all configured to operate in two modes. In a mode in which trace memory unit 300 appears as a single (32K) (buffer) block of trace memory, counting unit 310 operates as a 2-bit extension of counting unit 308 to form a single 15-bit counter. In another mode in which trance memory unit 300 appears as four, separate, (8K) (buffers) blocks of trace memory, counting unit 310 operates a s a block selecting/multiplexing unit. For these purposes, the two lowest order preset inputs of the counting device are connected each tot the sixth and seventh order data lines (D5 and D6) of bus 212. The two lowest order data outputs of the counting device are connected each to a respective line of the two highest order lines of the 15 lines of bus 330. The clock input of the counting device is connected, with the counting devices and the flip-flop of counting unit 308, to the output of the circuitry which is driven by the store controlling signal developed on t eh line of bus 280; and, the load input of the counting device is connected, with the load input of the third counting device of counting unit 308, to interface unit 206. The P enable input of the counting device is connected both to the Y1 data output of the selecting/multiplexing device and to one of the (two) inputs of a first one of the gates; the T enable input of the counting device is connected ot the Y2 data output of the selecting/multiplexing device; and, the ripple-carry output of the counting device is connected to the other input of the first gate, the output of which is connected to the A3 data input of the selecting/multiplexing device. THe other data inputs of the selecting/multiplexing device are connected, the B0 and A0 data inputs to receive a circuit ground potential; the B1 and B2 data inputs to interface unit 206; the A1 data input to the K input of the flip-flop of counting unit 308; the A2 data input to the (inverted) output of the flip-flop of counting unit 308; and the B3 data input to the output of the other (second) one of the gates, the (two) inputs of which are connected on to the J input of the flip-flop of counting unit 308 and the other to the (non-inverted) output of the flip-flop of counting unit 308.

Mobile incident logger 100 employs at race memory unit 340 which stores incidents relating to memory variables of on-board computer 102. For this purpose, memory unit 300 has a buffer unit 342, a random access memory (RAM) unit 344, another buffer unit 346, a counting unit 348, and another counting unit 350, all of which are similar to the respective components of trace memory unit 300. Of course, buffer unit 342 does not include the devices which would duplicate the bus 210 to bus 212 coupling function performed by some of the 74HC245-type octal transceiving devices of buffer unit 302; buffer unit 342 and random access memory (RAM) unit 344 are connected to a bus 352 (as opposed to bus 320); and, counting unit 350 is connected to another line of bus 280.

With additional reference to FIG. 1B, mobile incident logger 100 is shown to additionally employ a clock/calendar timer 400; a sample controller 402; an analog-to-digital (A/D) converter 404; a register unit 406; a discriminator (comparator) 408; a trace memory unit 410; and a power controller 412. Clock/calendar timer 400 includes four, real time clock modules of the type which are designated RTC62421B by the Epson Corporation and circuitry for interfacing the modules to (bus 212 and, thus,) interface unit 206. The modules are configured each to delineate the data and time at which recording ends in a respective 8K block of trace memory. (To delineate a time and date, the timing operation of a respective one of the modules is halted by writing the requisite bit pattern into the requisite module register. For this purpose, resistors are provided which, when t he busses are tri-stated, pull the lines of the (register) address and data busses of the modules to a state in which the requisite bit pattern can be written into the requisite register y means of a simple clocking signal.) In addition a constant frequency clocking signal developed by one of the modules is coupled to a line 420 to drive sample controller 402.

Analog-to-digital (A/D) converter 404 includes four devices of the type which are designated 7575 by the Analog Devices Corporation. THE four devices are configured, each to convert, form analog to (8-bit) digital form, a respective one of four analog signals which ar developed on a respective line of bus 126, at each of a series of times designated by a signal developed on a line 430. The devices each develop the digital signals on a respective set of eight lines of a 40 line bus 432.

Discriminator 408 detects the occurrence of some of the incidents the logger is to record. For this purpose, discriminator 408 has a buffer unit 450, a random access memory (RAM) unit 452, and another buffer unit 454. Buffer unit 450 includes a pair of 74HC244-type octal buffering devices (not shown), which are configured to selectively couple the signals developed on the 16 address lines of bus 212 each to a line of bus 432. More particularly, The (eight) data inputs of one o the buffering devices are connected each to he corresponding line o the eight lowest order lines of the 16 address lines of bus 212. Connected to each of the eight highest order lines of the 16 address lines of bus 212 are each of the respective data inputs of the other one of the buffering devices. The data outputs of the buffering devices are connected each tot the respective line of the respective set of eight lines of bus 432. The output-enable inputs of each of the devices are connected to interface unit 206.

Random access memory (RAM) unit 452 includes a HM6287PL-70-type, 64K-by-1, static (CMOS) random access memory (RAM) device (not shown). The memory device is configured with the 16 address inputs of the device each connected to the respective line of the two sets of eight lines of bus 432 to which buffer unit 450 is connected. THe data output of the device is connected to trigger/end controller 208 by a line 460. The chip-selected, write-enable, and data inputs of the device are connected to interface unit 206.

Buffer unit 454 includes a 74HC244-type octal buffering device (not shown), which is configured to selectively couple the signal developed on line 460 to a lien of bus 212. MOre particularly, one of the data inputs of the device is connected to line 460. The eight data outputs of the device are connected each to the corresponding lines of the eight data lines of bus 212. THE output-enable inputs of the device is connected to interface unit 206.

Trace memory unit 410 stores incidents relating tot he level of the analog signals developed by the (analog) sensors which drive on-board computer 102 and the state of the digital signals developed by the (digital) sensors which drive the computer 102. For this purpose, memory unit 410 has a buffer unit 472, a random access memory (RAM) unit 474, another buffer unit 476, a counting unit 478, and another counting unit 480, all of which are similar to the respective components of trace memory unit 300. Of course, buffer unit 472 and random access memory unit 474 are connected to bus 432 (as opposed to bus 210) and to a bus 490 (as opposed to bus 320); and, counting unit 480 is connected ot another line of bus 280.

Power controller 412 selects the source of DC electrical power for mobile incident logger 100. When logger 100 is connected to an automobile and when DC electrical power is available from lien 170, controller 412 obtains the logger power from the line 170 power. When DC electrical power is not available from lien 170, controller 412 obtains the logger 100 power from (interface unit 206 and, thus,) personal computer 140, Finally, when DC electrical power is not available either from line 170 or from computer 140, controller 412 obtains the logger 100 power from a batter 490. When power is being obtained from logger simply saves the programming and the incident recordings.

Operationally, in the programming mode, mobile incident logger 100 is connected to personal computer 140 (shown in FIG. 1A). (Logger 100 may, or may not, be connected to on-board computer 102.) In the programming mode, computer 140 stores various signal states, initializing and configuring the various components of logger 100. More specifically, computer 140 configures trigger/end controller 208 as to the type of end triggering signal to which the controller is to respond (the end triggering signal developed on t eh line of bus 280 by gate unit 250, the end triggering signal developed on line 460 by random access memory (RAM) unit 452, an OR combination of these two signals, an AND combination of these two signals, or one of the wrap indicating signals developed by counting units 308 and 310, 348 and 350, and 478 and 480). Also, computer 140 initializes random access memory (RAM) unit 230 by filling each of the memory locations in the unit with zeros. In addition, computer 140 configures page register 222 as to the page of computer 102 random access memory (RAM), memory coverage monitor 220 it to record accesses to. Further, computer 140 configures comparator unit 228 as to the type of memory accesses, coverage monitor 220 is to record (jut reads, jut writes, reads or writes, or jut instruction fetches (LIRs)). Also, computer 140 initializes random access memory (RAM) units 244, 304, 344, 452 (shown in FIG. 1B), and 474 by storing in the various memory locations, bit patterns which specify the incidents logger 100 is to record. Finally, computer 140 initializes clock/calendar timer 400 by writing into the modules of the timer, the current data and time.

Thereafter, personal computer 140 may (or may not) be disconnected. If not already connected to on-board computer 102, mobile incident logger 100 is connected thereto. When not powered by DC power obtained either from computer 140 or from the automobile, logger 100 is in the sleep mode. When the automobile ignition is turned on, logger 100 enters the recording mode. (Logger 100 may be manually switched "on" (into the recording mode) even when the ignition switch is off.)

In t he recording mode, in random access memory (RAM) unit 280, signal state are stored that record which locations in t eh preselected page of the random access memory (RAM) of on-board computer 102 the microprocessor of the computer had accessed.

Also, in the recording mode, signal states are stored (at least temporarily) in random access memory (RAM) units 304 and 344 during each of the bus states of the microprocessor of on-board computer 102 (each storage time being defined by the clocking signal developed by clock generator 200 on line 202). Stored in random access memory (RAM) units 304 and 344 are the states of each of the signals developed don bus 210 (including the state of the address the data and th status (control) signals developed by the microprocessor of computer 102). also, stored in random access memory (RAM) units 304 and 344 are the states of each of the signals developed on bus 238 by cycle tag counting unit 237 (the bus 238 signal state representing a count of the bus states (clocking signal cycles) of the microprocessor of computer 102). Additionally, stored in random access memory (RAM) units 304 and 344 are the states of each of the status signals developed on the respective one of the busses 320 and 352. (The bus 304 stored status states include a space, a trace level one indicating state, a trance level zero indicating state, a controller status state, a stored data valid indicating state, a random access memory (RAM) unit 304 has wrapped indicating state, a cycle tag counting unit 237 count has wrapped indicating state, and an end indicating state. The bus 344 stored status states include a space, a trace level one indicating state, a trace level zero indicating state, a RAM variable status state, a stored data valid indicating state, a random access memory (RAM) unit 344 has wrapped indicating state, a cycle tag counting unit 237 count has wrapped indicating state, and an end indicating state.)

Similarly, in the recording mode, signal states are stored (at least temporarily) in random access memory (RAM) unit 374 at each of the times defined by a signal developed by clock sample controller 402 and at each of the time defined by the store controlling signal developed on one of the lines of bus 280. Stored in random access memory (RAM) unit 374 are the state of each of the signals developed on bus 432 (including the states of th digitized analog sensor signals developed on bus 430). Also, stored in random access memory (RAM) unit 374 are the state of each of the signals developed on bus 238 by cycle tag counting unit 237 and the states of each of the status signals developed on bus 490. (The bus 490 stored status states include three spaces, a controller status state, an end of stored status state, a random access memory (RAM) unit 374 has wrapped indicating state, a cycle tag counting unit 237 count has wrapped indicating state, and an end indicating state.))

However, it is important to not that, unless the respective counting units are incremented (counting unit s308 and 310 for random access memory (RAM) unit 304, counting units 348 and 350 for random access memory (RAM) unit 344, and counting units 479 and 480 for random access memory (RAM) unit 474), the stored signal states will be immediately over written. A a consequence, only data (incidents) are "recorded" which meet the pre-programmed criteria. THus, the data is "filtered" to "compress" the amount of data to a manageable level.

It is important to note that, mobile incident logger 100 simultaneously acquires high speed data, such as successive on-board computer 102 microprocessor bus states, recorded in trace memory unit 300; moderate speed date, such as successive references by the microprocessor to variables stored in t eh microprocessor random access memory (RAM), recorded in trace memory unit 340; and low speed data, such as external sensor data, recorded in trace memory unit 410. A the data is recorded, it is 'filtered' to 'compress' the amount of data to a manageable level without sacrificing either the high speed or the low speed data. The correlation between the data is maintained by means of the cycle tag counting unit 237 count stored with each data entry.

In this regard, it is important to note that the cycle tag counting unit 237 count is only 24-bits in length. A a consequence, depending upon t eh clocking frequency of the microprocessor of on-board computer 102, the count 'rolls over' every few seconds. Yet, mobile incident logger 100 may be recording incidents which occur over a period of many days. Of course, to provide a meaningful cycle tag count, a count having a much greater bit length could be used. However, a much greater cycle tag count bit length would require additionally storage. In t he present invention, to provide meaningful information while "compressing" the amount of data, ht counting unit s for the trace memory units (counting units 308) and 310 for trace memory unit 300, counting unit 348 and 350 for trace memory unit 340, and counting units 378 and 380 for trace memory unit 410) are incremented each time the cycle tag counting unit 237 count "rolls over", forcing the recordation of data in each of the trace memory units. (To identify such an incident, the status signals recorded with the data identifies that the data was recorded because the cycle tag counting unit 237 count 'rolled over' and whether the data is valid (would have been recorded for other reasons). Thus, depth of the trace memory units (300, 340, and 410) is given up to store overflow of cycle tag counting unit 237 on an as-needed basis. This, in effect, extends the width (magnitude) of the count, allowing chronological reconstruction of high speed events occuring over a relatively long period of time.

Finally, it is important to note that both real-time (sensor) data and th decisions based thereon (rAm variable data and bus states) is recorded. Also, not only is the data supplied by the sensors recorded, but that data as seen by the microprocessor and stored in the microprocessor random access memory (RAM) is recorded.

In the reporting mode, mobile incident logger 100 is again connected to personal computer 140. (Logger 100 may, or may not, be connected to on-board computer 102.) In the reporting mode, when requested by means of signals developed by computer 140 on bus 142, logger 100 develops on the bus signals which represent recorded incidents.

It is contemplated that after having read the preceding disclosure, certain alterations and modifications of the present invention will no doubt become apparent to those skilled in the art. It is therefore intended that he following claims be interpreted to cover all such alterations and modifications as fall within the true spirit and scope of the invention.

What is claimed is:

1. An apparatus for recording the states of data signals at times defined by a clocking signal, when the data signals meet at least one of a number of predetermined criteria, the apparatus comprising in combination:
cycle tag counting means in response to the clocking signal develops signals representing a count of the cycles of said clocking signal;
discriminator means having a predetermined number of outputs, said discriminator means in response to the data signals develops at each of said discriminator means outputs a signal the state of which indicates whether said data signals meet at least one of the criteria; and
trace memory means including a predetermined number of portions each having
counting means connected to said discriminator means, each of said trace memory means counting means in response store a corresponding one of said criteria indicating signals develops signals representing at least a count of the cycles of said corresponding one of said criteria indicating signals and
random access memory means connected to said cycle tag counting means and having address inputs connected to the corresponding one of said trace memory means counting means, said trace memory means random access memory means in response to said data signals, said cycle tag counting means count signals, and ht respective trace memory means counting means count signals stores signal states representing both said data signals and said cycle tag counting means count signals when said data signals meet at least one of said criteria.

2. An apparatus as recited in claim 1 wherein said cycle tag counting means develops said cycle tag counting means count signals so as to have a predetermined bit length, wherein said cycle tag counting means further develops a signal which indicates when said cycle tag counting means count rolls over, wherein each of said trace memory means counting means is further connected to said cycle tag counting means, wherein each of said trace memory means counting means in response to said roll over indicating signal develops said respective trace memory means counting means count signals so as to represent the sum of said count of said cycles of said corresponding one of said criteria indicating signals and a count of the cycles of said roll over signal, and wherein s aid trace memory means further stores signal states representing both said data signals and said cycle tag counting means count signals when said count rolls over.

3. An apparatus for recording the states of data signals at times defined by a clocking signal, when the data signals meet predetermined criteria, the apparatus comprising in combination:
cycle tag counting means in response to the clocking signal develops signals representing a predetermined bit length count other e cycles of said clocking signal and a signal indicating when said count rolls over;
discriminator means having an output, said discriminator means in response to the data signals develops at said discriminator means output a signal the state of which indicates whether said data signals meet the criteria; and
trace memory means including counting means connected to said discriminator means and to said cycle tag counting means, said trace memory means counting means in response to said criteria indicating signal and to said roll over indicating signal develops signals representing the sum of a count of the cycles of said criteria indicating signal and a count of the cycle of said roll over signal, an d random access memory means connected to said cycle tag counting means and having address inputs connected to said trace memory means counting means, said trace memory means random access memory means in response to said data signals, aid cycle tag counting means count signals, and said trace memory means counting means count signals stores signal state representing both said data signals and said cycle t ag counting means count signals when said data signals meet said criteria and stores signal state representing both said data signals and said cycle tag counting means count signals when said count rolls over.

4. A mobile incident logger for recording the state of signals which represent the bus state of a microprocessor of an on-board computer at times defined by a clocking signal developed by the microprocessor, the level of signals developed by a number of analog sensors, and th state of signals developed by a number of digital sensors, when the signals meet predetermined criteria, the logger comprising in combination:

a clock generator in response to the microprocessor clocking signal develops a buffered clocking signal;

first register means connected to said clock generator, said first register means in response to said buffer clocking signal and the microprocessor bus state signals latches the state of said microprocessor bus state signals at each of the times defined yb said buffered clocking signal and develops signals having said latched states;

cycle tag counting means connected to said clock generator, said cycle t ag counting means in response to said buffer clocking signal develops signals representing a predetermined bit length count of the cycles of said buffered clocking signal and develops a signal indicating when said count rolls over;

first discriminator means connected to said first register means and having at least one output, said first discriminator means in response to said latched state signals develops at said first discriminator means output a first signal the state of which indicates whether said latched state signals meet the criteria; and first trace memory means including counting means connected to said first discriminator means to and to said cycle tag counting means, said first trace memory means counting means in response to said first criteria indicating signal and to said roll over indicating signal develops signals representing the sum of a count of the cycle of said first criteria indicating signal and a count of the cycles of said roll over signal, and random access memory means having data inputs connected to said first register means and to said cycle tag counting means and having address inputs connected to said first trace memory means counting means, said first trace memory means random access memory means in response to said latched state signals. said cycle tag counting means count signals, and said first trace memory means counting means count signals stores signal state representing both said latched state signals and said cycle tag counting means count signals when said latched state signals meet said criteria and stores signal state representing both said latched state signals and said cycle tag counting means count signals when said count rolls over.

5. A mobile incident logger as recited in claim 4 wherein said first discriminator means includes random access memory means having address inputs connected to said first register means and having at least one data output connected to said first discriminator means output.

6. A mobile incident logger as recited in claim 4 wherein said first discriminator means further develops a second criteria indicating signal and wherein said mobile incident logger further comprises second trace memory means including counting means connected to said first discriminator means and to said cycle tag counting means, said second trace memory means counting means in response to said second criteria indicating signals and said roll over indicating signal develops signals representing the sum of a count of he cycles of said second criteria indicating signal and a count of the cycles of said roll over signal, and random access memory means having data inputs connected to said first register means and to said cycle tag counting means and having address inputs connected to said second trace memory means counting means, said second trace memory means random access memory means in response to said latched state signals, said cycle tag counting means count signals, and said second trace memory means counting means count signals stores signal states representing both said latched state signals and said cycle tag counting means count signals when said latched state signals meet said criteria and stores signal states representing both said latched state signals and said cycle tag counting means count signals when said count rolls over.

7. A mobile incident logger as recited in claim 4 wherein said first discriminator means further develops a second criteria indicating signal and wherein said mobile incident logger further comprises, analog-to-digital converter means in response to said analog sensor signals converts from analog to digital format said analog sensor signals; and second race memory means including counting means connected to said first discriminator means and to said cycle tag means, said second trace memory means counting means in response to said second criteria indicating signals and to said roll over indicating signal develops signals representing the sum of a count of the cycles of said second criteria indicating signal and a count of the cycles of said roll over signal, and random access memory means having data inputs connected to said analog-to-digital converter means and to said cycle tag counting means and having address inputs connected to said second trace memory means counting means, said second trace memory means random access memory means in response to said converted format signals, said cycle tag counting means count signals, and said second race memory means counting means count signals stores signal states representing both said converted format signals and said cycle tag counting means count signals both when said latched state signals meet said criteria and when said count rolls over.

8. A mobile incident logger as recited in claim 7 wherein said first discriminator means further develops a third criteria indicating signal and wherein said mobile incident logger further comprises third trace memory means including counting means connected to said first discriminator means and to said cycle tag counting means, said third trace memory means counting means in response to said third criteria indicating signal and to said roll over indicating signal develops signals representing the sum of a count of the cycles of said third criteria indicating signal and a count of the cycles of said roll over signal, and random access memory means having data inputs connected to said first register means and to said cycle tag counting means and having address inputs connected to said third trace memory means counting means, said third trace memory means random access memory means in response to said latched state signals, said cycle tag counting means count signals, and said third trace memory means counting means count signals stores signal state representing both said latched state signals and said count signals when said cycle tag counting means latched state signals meet said criteria and stores signal states representing both said latched state signals and said cycle tag counting means count signals when said count rolls over.

9. A mobile incident logger as recited in claim 4 wherein said mobile incident logger further comprises,
   clock/calendar timer develops a signal having a predetermined frequency;
   analog-to-digital converter means in response to the analog sensor signals, converts from analog to digital format said analog sensor signals; and
   second race memory means including counting means connected to said clock/calendar timer and to said cycle tag counting means, said second race memory means counting means in response to said predetermined frequency signal and to said roll over indicating signal develops signals representing the sum of a count of the cycles of said predetermined frequency signal and a count of the cycles of said roll over signal, and random access memory means having data inputs connected to said analog-to-digital converter means and to said cycle tag counting means and having address inputs connected to said second trace memory means counting means, said second trace memory means random access memory means in response to said converted format signals, said cycle tag counting means count signals, and said second trace memory means counting means count signals stores signal states representing both said converted format signals and said cycle tag counting means count signals both at each of the times defined by said predetermined frequency signal and when said count rolls over.

10. A mobile incident logger as recited in claim 4 further comprises, a coverage monitor including random access memory means having address inputs connected to said first register means and having a plurality of memory locations, said coverage monitor in response to said latched state signals stores a predetermined signal state at each one of said memory locations which are addressed by said latched state signals.

11. A mobile incident logger as recited in claim 10 wherein said first discriminator means further develops a second criteria indicating signal and wherein said mobile incident logger further comprises second trace memory means including counting means connected to said first discriminator means and to said cycle tag counting means, said second trace memory means counting means in response to said second criteria indicting signal and said roll over indicating signal develops signal representing the sum of a count of the cycles of said second criteria indicating signal and a count of the cycles of said roll over signal, and random access memory means having data inputs connected to said first register means and to said cycle tag counting means and having address inputs connected to said second trace memory means counting means, said second race memory means random access memory means in response to said latched stat e signal, said cycle tag counting means count signals, and said second race memory means counting means count signals stores signal states representing both said latched state signals and said cycle tag counting means count signals when said latched state signals meet said criteria and stores signal states representing both said latched state signals and said cycle tag counting means count signals when said count rolls over.

12. A mobile incident logger as recited in claim 10 wherein said first discriminator means further develops a second criteria indicating signal and wherein said mobile incident logger further comprises,
   clock/calendar timer develops a signal having a predetermined frequency;
   second register means connected to said clock/calendar timer, said second register means in response to said predetermined frequency signal and the digital sensor signals latches the state of said digital sensor signals at each of the timer defined by said predetermined frequency signal and develops signals having said latched states;
   second discriminator means including random access memory means having address inputs connected to said second register means and having at least one data output, said first discriminator means in response to said latched state signals develops at said second discriminator means random access memory means data output a signal the state of which indicates whether said latched state signals meet the criteria; and
   second trace memory means including counting means connected to said second discriminator means and to said cycle tag counting means, said second trace memory means counting means in response to said second discriminator means criteria indicating signal and said roll over indicating signal develops signals representing the sum of a count of the cycles of said second discriminator means criteria indicating signal and a count of the cycles of said roll over signal, and random access memory means having data inputs connected to said second register means and to said cycle tag counting means and having address inputs connected to said second trace memory means counting means, said second trace memory means random access memory means in response to said latched state signals, said cycle tag counting means count signals, and said second trace memory means counting means count signals stores signal states representing both said latched state signals and said cycle ag counting means count signals both when said latched state signals meet said criteria and when said count rolls over.

13. A mobile incident logger as recited in claim 12 wherein said first discriminator means further develops a third criteria indicating signal and wherein said mobile incident logger further comprises third trace memory means including counting means connected to said first discriminator means and to said cycle tag counting means, said third trace memory means counting means in response to said third criteria indicting signal and said roll over indicating signal develops signals representing the sum of a count of he cycles of said third criteria indicating signal and a count of the cycles of said roll-over signal, and random access memory means having data inputs connected to said first register means and to said cycle tag counting means and having address inputs connected to said third trace memory means counting means, said third trace memory means random access memory means in response to said latched state signals, said cycle tag counting means count signals, and said third trace memory means counting means count signals stores signal states representing both said latched state signals and said cycle tag counting means count signals when said latched state signals meet said criteria and stores signal states representing both said latched state signals and said cycle tag counting means count signals when said count rolls over.

* * * * *